United States Patent
Watson

(10) Patent No.: US 8,326,631 B1
(45) Date of Patent: Dec. 4, 2012

(54) SYSTEMS AND METHODS FOR SPEECH INDEXING

(75) Inventor: Joseph Alva Watson, Alpharetta, GA (US)

(73) Assignee: Verint Americas, Inc., Roswell, GA (US)

(*) Notice: Subject to any disclaimer, the term of this patent is extended or adjusted under 35 U.S.C. 154(b) by 916 days.

(21) Appl. No.: 12/415,688

(22) Filed: Mar. 31, 2009

Related U.S. Application Data

(60) Provisional application No. 61/041,628, filed on Apr. 2, 2008.

(51) Int. Cl.
*G10L 15/00* (2006.01)

(52) U.S. Cl. .......... 704/270; 704/251; 704/275

(58) Field of Classification Search .......... 704/251, 704/270, 275
See application file for complete search history.

(56) References Cited

U.S. PATENT DOCUMENTS

| | | | |
|---|---|---|---|
| 6,263,308 B1 * | 7/2001 | Heckerman et al. | 704/231 |
| 6,785,650 B2 * | 8/2004 | Basson et al. | 704/235 |
| 7,181,398 B2 * | 2/2007 | Thong et al. | 704/254 |
| 7,228,275 B1 * | 6/2007 | Endo et al. | 704/235 |
| 7,299,179 B2 * | 11/2007 | Block et al. | 704/254 |
| 7,310,600 B1 * | 12/2007 | Garner et al. | 704/234 |
| 2002/0046023 A1 * | 4/2002 | Fujii et al. | 704/231 |
| 2005/0102142 A1 * | 5/2005 | Soufflet et al. | 704/246 |
| 2005/0143998 A1 * | 6/2005 | Ogawa | 704/251 |
| 2007/0027693 A1 * | 2/2007 | Hanazawa | 704/275 |
| 2007/0276651 A1 * | 11/2007 | Bliss et al. | 704/9 |
| 2010/0217598 A1 * | 8/2010 | Adachi | 704/254 |

* cited by examiner

*Primary Examiner* — Jialong He
(74) *Attorney, Agent, or Firm* — Meunier Carlin & Curfman

(57) ABSTRACT

A speech index for a recording or other representation of an audio signal containing speech is generated using a phonetic automatic voice recognition engine. A second speech index is also generated using a more accurate, but slower, automatic voice recognition engine such as a large vocabulary speech recognition (LVSR) engine. These two speech indexes are compared. The results of the comparison are then used to adjust certain parameters used by the phonetic engine while generating a speech index. The results may also be used to correct all or parts of the speech index generated by the phonetic automatic speech recognition engine.

14 Claims, 4 Drawing Sheets

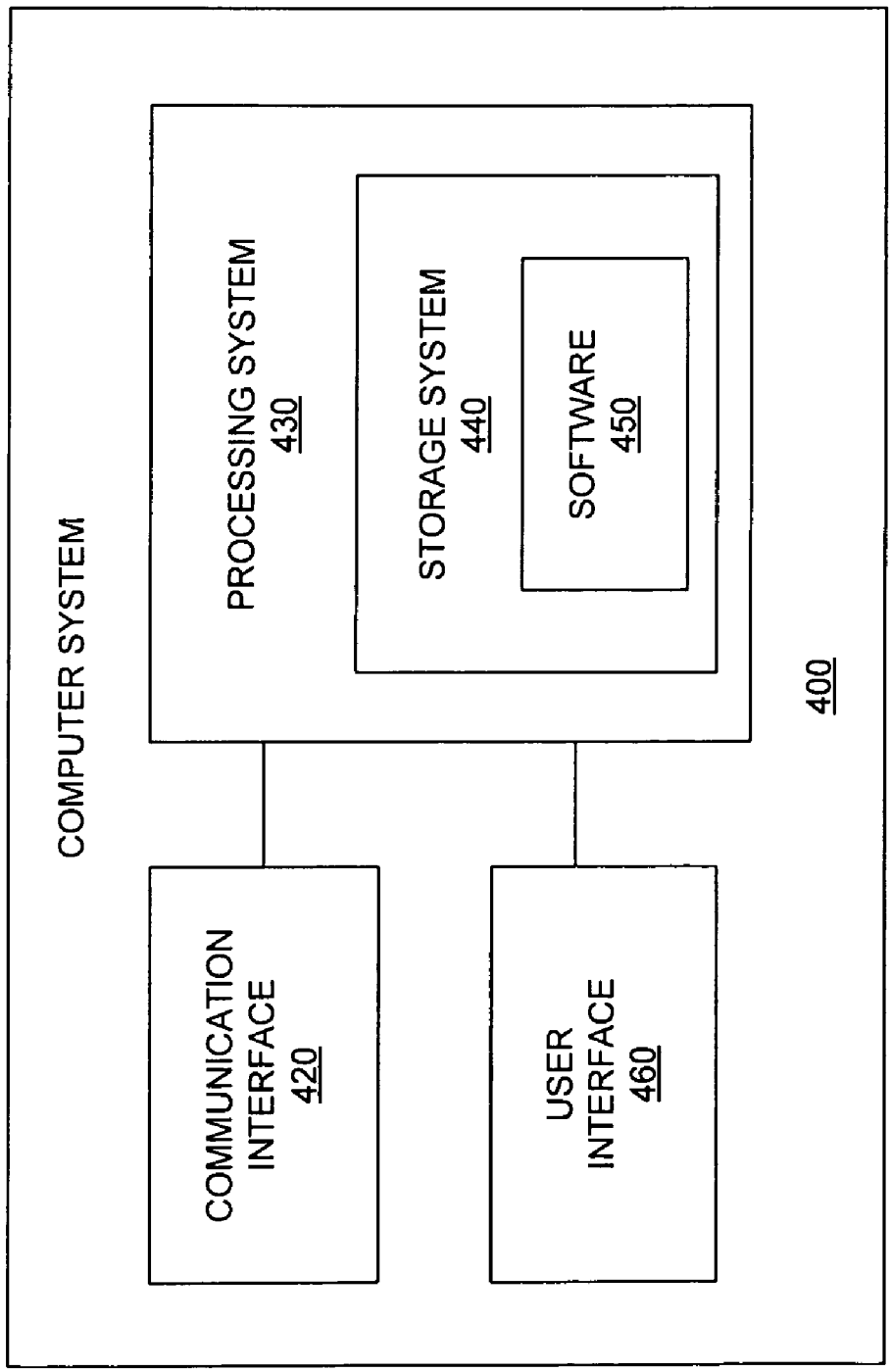

SYSTEMS AND METHODS FOR SPEECH INDEXING

RELATED APPLICATIONS

This application is related to and claims priority to U.S. Patent Application No. 61/041,628, entitled "SYSTEMS AND METHODS FOR SPEECH INDEXING," and filed on Apr. 2, 2008, which is hereby incorporated by reference in its entirety.

TECHNICAL FIELD

The invention is related to the field of speech analytics and more particularly to speech indexing.

TECHNICAL BACKGROUND

Speech indexing is the process of using Automatic Voice Recognition (AVR) to create a searchable database of the content of an audio recording. Once created, this database may be used to analyze the contents of the call. Take, for example, a telephone polling agency that needs to make sure that each pollster is adhering to a predefined script so that the results are consistent or may be tracked over time. (E.g. "As a likely voter, are you more or less likely to vote Republican?" may yield a different answer than "Are you less or more likely to vote Republican if you vote?") By creating a searchable database of what was said on each polling call, key questions and answers can be individually checked by searching the database for the key question to determine the exact time the key question was asked. The playback of the call may then be advanced to that time and a human listener can confirm the question was asked properly and the response was recorded accurately. This saves the time of the person checking the accuracy of each call as they otherwise would need to listen to the entire call to find the key question and answer.

Unfortunately, efficient AVR engines that are fast are more prone to making errors. Accordingly, speech indexing systems that rely upon these efficient AVR systems may produce false entries in the database. For example, a speech indexing system using an efficient AVR engine may misclassify the spoken phrase "likely repeat voter" as "likely Republican voter." This may cause the resulting speech index to have multiple entries for the phrase "likely Republican voter" when it was only spoken once. Accordingly, if a person checking the call was looking for the phrase "likely Republican voter" they would need to listen to two parts of the call instead of just one. Therefore, there is a need in the art for improvements to the accuracy of speech indexing systems that use efficient AVR systems.

OVERVIEW

In an embodiment, a speech index for a recording or other representation of an audio signal containing speech is generated using a phonetic automatic voice recognition engine. A second speech index is also generated using a more accurate, but slower, automatic voice recognition engine such as a large vocabulary speech recognition (LVSR) engine. These two speech indexes are compared. The results of the comparison are then used to adjust certain parameters used by the phonetic engine while generating a speech index. The results may also be used to correct all or parts of the speech index generated by the phonetic automatic speech recognition engine.

In an embodiment, a speech index for a recording is generated using a phonetic automatic voice recognition engine. Words or phrases that the phonetic engine classified with low confidence values are selected. A LVSR engine is then applied to portions of the recording somewhat before and after each low confidence occurrence. If the LVSR engine agrees with the phonetic engine, a parameter associated with the phenome set used to classify the low confidence word or phrase is changed so that the next time that phenome set is used to classify that word or phrase, it will output a higher confidence value. If the LVSR engine disagrees with the phonetic engine, a parameter associated with the phenome set used to classify the low confidence word or phrase is changed so that the next time that phenome set is used to classify that word or phrase, it will output a lower confidence value.

In an embodiment, a method of indexing speech comprises associating a first phonetic sequence with a first position in an audio signal using a phonetic recognize, associating said first phonetic sequence to a first linguistic element based on a first parameter, associating a second linguistic element with a second position in said audio signal using a large vocabulary speech recognizer (LVSR), comparing said first position and said second position to determine a phrase window, comparing said first linguistic element to said second linguistic element if said phrase window meets a first criteria, and adjusting said first parameter based upon a result of said step of comparing said first linguistic element.

In another embodiment, a system for indexing speech comprises a phonetic decoder that associates audio features of an audio signal with a first phonetic sequence at a first position in said audio signal. The system further comprises a lexical interpreter that associates said first phonetic sequence with a first linguistic element based on a first parameter. The system further comprises a large vocabulary speech recognizer that associates a second linguistic element with a second position in said audio signal. The system further comprises a speech index comparator that compares said first position and said second position to determine a phrase window. The speech index comparator also compares said first linguistic element to said second linguistic element if said phrase window meets a first criteria. The system further comprises a parameter adjuster that adjusts said first parameter based upon a result of said speech index comparator.

In another embodiment, a program storage device readable by a machine, tangibly embodying a program of instructions executable by the machine to perform method steps for indexing speech, comprising associating a first phonetic sequence with a first position in an audio signal using a phonetic recognizer, associating said first phonetic sequence to a first linguistic element based on a first parameter, associating a second linguistic element with a second position in said audio signal using a large vocabulary speech recognizer (LVSR), comparing said first position and said second position to determine a phrase window, comparing said first linguistic element to said second linguistic element if said phrase window meets a first criteria, and adjusting said first parameter based upon a result of said step of comparing said first linguistic element.

DETAILED DESCRIPTION

Figure 1:
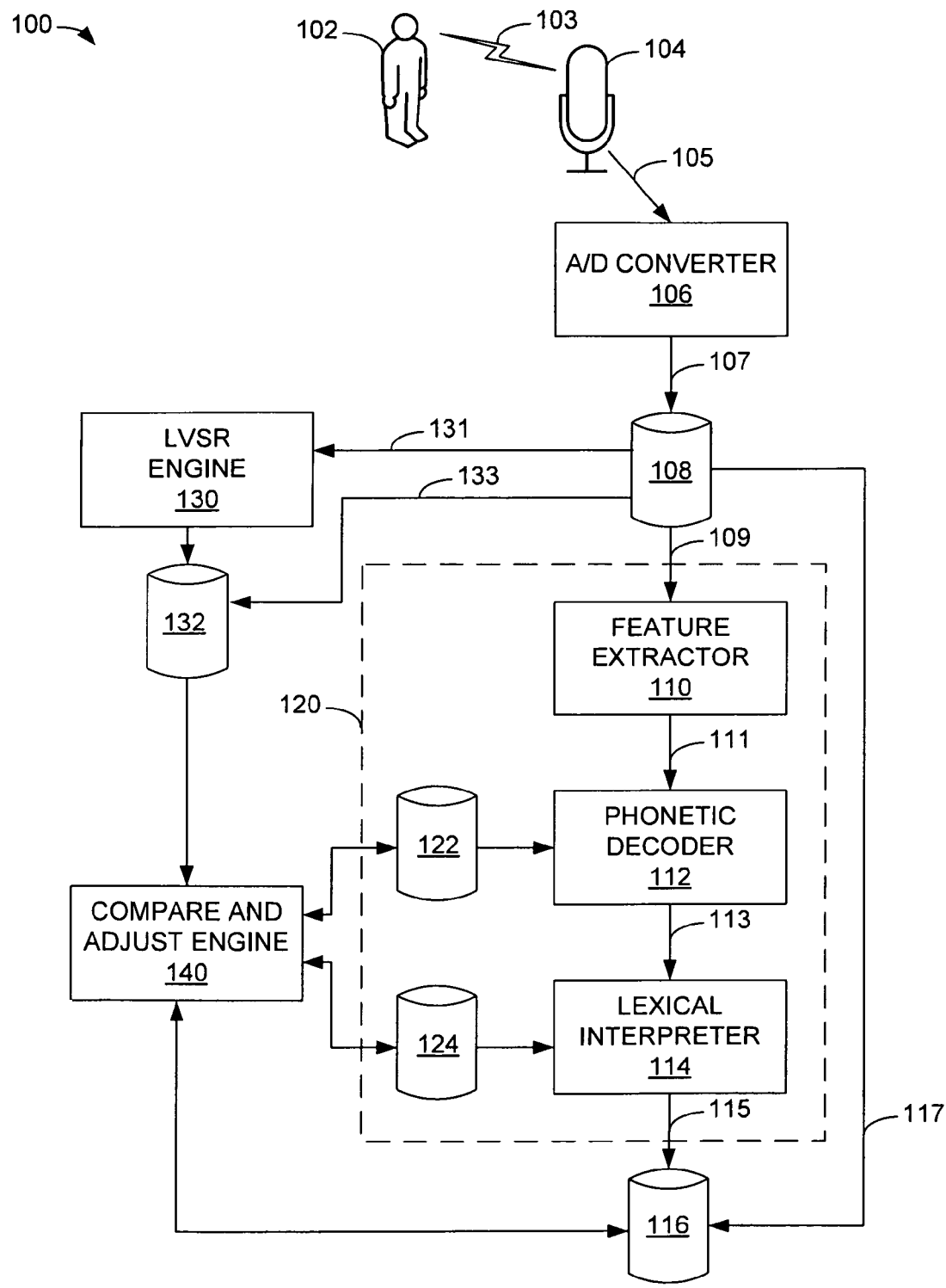
FIG. 1 is a block diagram illustrating a tunable phonetics based speech indexing system.

FIG. 1 is a block diagram illustrating a tunable phonetics based speech indexing system 100. Speaker's 102 speech 103 is converted to an analog electrical signal 105 by microphone 104. Analog electrical signal 105 may be converted to a digital signal 107 by Analog to Digital (A/D) converter 106. Digital signal 107 may be stored on a machine readable medium as digital recording 108. The machine readable medium containing digital recording 108 may supply a copy of all or part of digital signal 109 to a phonetic based speech recognition engine 120. Phonetic based speech recognition engine 120 includes feature extractor 110. Feature extractor 110 generates a sequence of acoustic features 111. The sequence of acoustic features 111 may, for example, comprise cepstrum coefficients and their derivatives with respect to time.

The sequence of acoustic features 111 forms an input to phonetic decoder 112. Phonetic decoder 112 matches the sequence of acoustic features 111 against a set of models 122 representing phonetic units. The phonetic units may correspond approximately to the phonemes in a language. The set of models 122 may be a large general set so that phonetic engine 120 may classify all of the spoken words in speech 103. Alternatively, set of models 122 may be a limited set of models chosen to classify a limited set of words, phrases, or search terms. The output of phonetic decoder is a sequence of phonetic units 113 representing phoneme-like sounds. In addition, the sequence of phonetic units 113 may correspond to a lattice of phonetic units rather than a simple sequence. Sequence of phonetic units 113 forms an input to lexical interpreter 114. Lexical interpreter 114 matches sequence of phonetic units 113 to reference pronunciations using parametric information 124. Parametric information 124 may comprise reference pronunciations, corresponding lexical interpretations, probabilities, context information, and learned information. Parametric information 124 may comprise a large general set of reference pronunciations and corresponding lexical interpretations so that phonetic engine 120 may classify all of the spoken words in speech 103. Alternatively, parametric information 124 may comprise a limited set of reference pronunciations and lexical interpretations chosen to classify a limited set of words, phrases, or search terms.

For example, lexical interpreter 114 may allow for discrepancies between the sequence of phonetic units 113 and a reference pronunciation. These discrepancies may have a variety of causes including background noise, the speaker's 102 accent, and context (e.g. "Buy now!" vs. " . . . by now . . . ") etc. Lexical interpreter may account for these discrepancies by, for example, using estimates of the probabilities of insertions and deletions of phonetic units and/or the substitutions between pairs of phonetic units. These estimates may be supplied as part of parametric information 124. These estimates may allow lexical interpreter 114 to assign a score, confidence value, or probability to each candidate reference pronunciation and/or lexical interpretation. The best scoring match, or highest probability, lexical interpretation may then be selected for output by lexical interpreter 114. The output of lexical interpreter 114 is a sequence of lexical interpretations 115, which may be words or phrases, represented as ASCII characters.

The sequence of lexical interpretations 115 is stored and is combined with time information 117 from digital recording 108 to produce speech index 116. Speech index 116, which may be stored in database form, includes lexical interpretations and time information that details the time or times in digital recording 108 a lexical element occurred. Speech index 116 may also contain a score, confidence value, or probability used to select the lexical element each time it occurs in speech index 116.

The machine readable medium containing digital recording 108 may also supply a copy of all or part of digital signal 131 to a more accurate speech recognition engine such as LVSR engine 130. Other speech recognition systems that may be more accurate than phonetic engine 120 may be used. In this discussion and for the sake of brevity, these will all be referred to as LVSR engines 130. The sequence of lexical interpretations produced by LVSR engine is combined with time information 133 from digital recording 108 to produce speech index 132.

Some or all of the entries in speech index 116 and speech index 132 are compared by compare and adjust engine 140. Compare and adjust engine can adjust values or entries in the set of models 122 and parametric information 124 to "tune" or "teach" phonetic engine 120 so that phonetic engine 120 produces a more accurate speech index 116. Compare and adjust engine 140 may also change or adjust entries in speech index 116. In an embodiment, compare and adjust engine 140 may also replace or correct an entry or entries in speech index 116 with corresponding entries from speech index 132.

To illustrate an example embodiment, consider an example case where the contents of speech index 116 specify that the phrase "thank you" occurred three times. Those occurrences were at 75.6, 92.1, and 101.8 seconds into digital recording 108. Further consider a case where the contents of speech index 132, after indexing the same recording, specifies that the phrase "thank you" occurred just once. That occurrence was at 92.2 seconds into digital recording 108. Compare and adjust engine 140 may determine that since the entry in speech index 116 for the "thank you" at 92.1 seconds was most likely correct because there was and entry in speech index 132 within a narrow window of time (e.g. 0.2 seconds) for the same lexical element (i.e., "thank you"). This narrow window of time may be considered a phrase window in which differences in the timing of the two entries is determined to be insignificant or due to inherent differences in the two speech recognition engines 120 and 130. Accordingly, differences in timing, within a phrase window may be ignored. Likewise, certain differences in content, such as homonyms (e.g. write and right) may also be ignored.

Compare and adjust engine 140 may also determine that the entries in speech index 116 for "thank you" at 75.6 and 101.8 seconds are most likely errors because there are no corresponding entries within a specified period of time in speech index 132. Accordingly, compare and adjust engine 140 may decide to adjust one or more values or entries in the set of models 122 and parametric information 124.

Continuing the example case, assume that compare and adjust engine 140 has decided to make an adjustment. Compare and adjust engine may extract the lexical elements from speech index 132 that were near in time to one that it determined was erroneous in speech index 116. For example, it may extract the lexical elements from speech index 132 that occurred near to the 75.6 second point. Assume, for example, that the lexical elements it extracts as being near the 75.6 point are "will crank two." Compare and adjust engine 140 may then correlate the reference phonetic sequences for the erroneous entry and the extracted elements. For example, "thank you" may have a reference phonetic sequence of /θæ ŋjk yu/. "Will crank two" may have a reference phonetic sequence of /wɪl kræŋk tu/. Correlating the two reference phonetic sequences may reveal that the /wɪl/ portion of the extracted elements, which corresponds to the word "will" does not correlate very much with the erroneous entry. Accordingly, compare and adjust engine may decide to ignore the "will" portion of the extracted elements and the parts of the reference phonetic sequence that correspond to the word "will."

Correlating the two reference sequences may also reveal that the /kræŋ k tu/ portion of the reference phonetic sequence for the extracted elements correlates highly with /θæŋ k yu/. It can be seen from these two reference phonetic sequences that the only differences are the reference phonetic sequence corresponding to the erroneous entry has a "θ" instead of a "kr" and a "y" instead of a "t". Compare and adjust engine 140 may then decide to adjust the set of models 122 so that "kr" is more likely to be chosen for the sequence of phonetic units. An adjustment that makes "kr" more likely to be chosen may also make it more likely lexical interpreter would choose the correct lexical element of "crank" instead of "thank." Compare and adjust engine 140 may also decide to adjust parametric information 124 so that a sequence of phonetic units of /θæŋ k yu/ is more likely to be interpreted as the lexical elements "crank two."

Consider another example case where the contents of speech index 116 specify that the phrase "I'm sorry" occurred four times in digital recording 108. Those occurrences were at 25, 50, 75 and 95 seconds into digital recording 108. These occurrences were assigned confidence values of 65, 95, 90, and 70, respectively. Further consider a case where the contents of speech index 132, after indexing the same recording, specifies that the phrase "I'm sorry" occurred just twice. Those occurrences were at 50 and 75 seconds into digital recording 108. Compare and adjust engine 140 may then determine that the entries in speech index 116 for "I'm sorry" at 25 and 95 seconds are most likely errors because there are no corresponding entries within a specified period of time in speech index 132. Thus, compare and adjust engine may conclude that occurrences with a confidence value less than 90 are likely to be errors. Accordingly, compare and adjust engine 140 may adjust one or more values or entries in the set of models 122 and parametric information 124 so that only words or phrases with confidence values greater than or equal to 90 are placed in speech index 116. After this adjustment, when the same digital recording 108 is indexed by phonetic engine 120, phonetic engine 120 would generate a speech index 116 that agreed with speech index 132 for the phrase "I'm sorry." Thus, phonetic engine 120 has been improved or "tuned."

Other adjustments to parametric information 124 are also possible. For example, compare and adjust engine may decide to set parametric information 124 so that the specific phrase "I'm sorry" is only placed in speech index 116 when it's confidence value is greater than or equal to 90. Alternatively, parametric information 124 may be adjusted so that all words, or a specific phrase such as "I'm sorry," are only placed in speech index 116 when their respective confidence value exceeds 70. (E.g. adjusting parametric information 124 with a threshold confidence value that is the highest confidence value for an entry determined by compare and adjust engine to be in error, either for all words, or just a specific word or phrase.) Alternatively, some other method may be chosen to adjust determine a threshold confidence value in parametric information 124 such as averaging the lowest confidence value for a correct entry and the highest confidence value for an incorrect entry. In another alternative, parametric information 124 may be adjusted so that a range of confidence values result in a word or phrase (or all words and phrases) being made an entry in speech index 116.

The foregoing are merely examples of ways that compare and adjust engine may decide to make adjustments Likewise the adjustments that are made in the foregoing examples are for illustrative purposes only. Other ways, means, methods, parameters, models, and adjustments are possible to tune phonetic engine 120.

Figure 2:
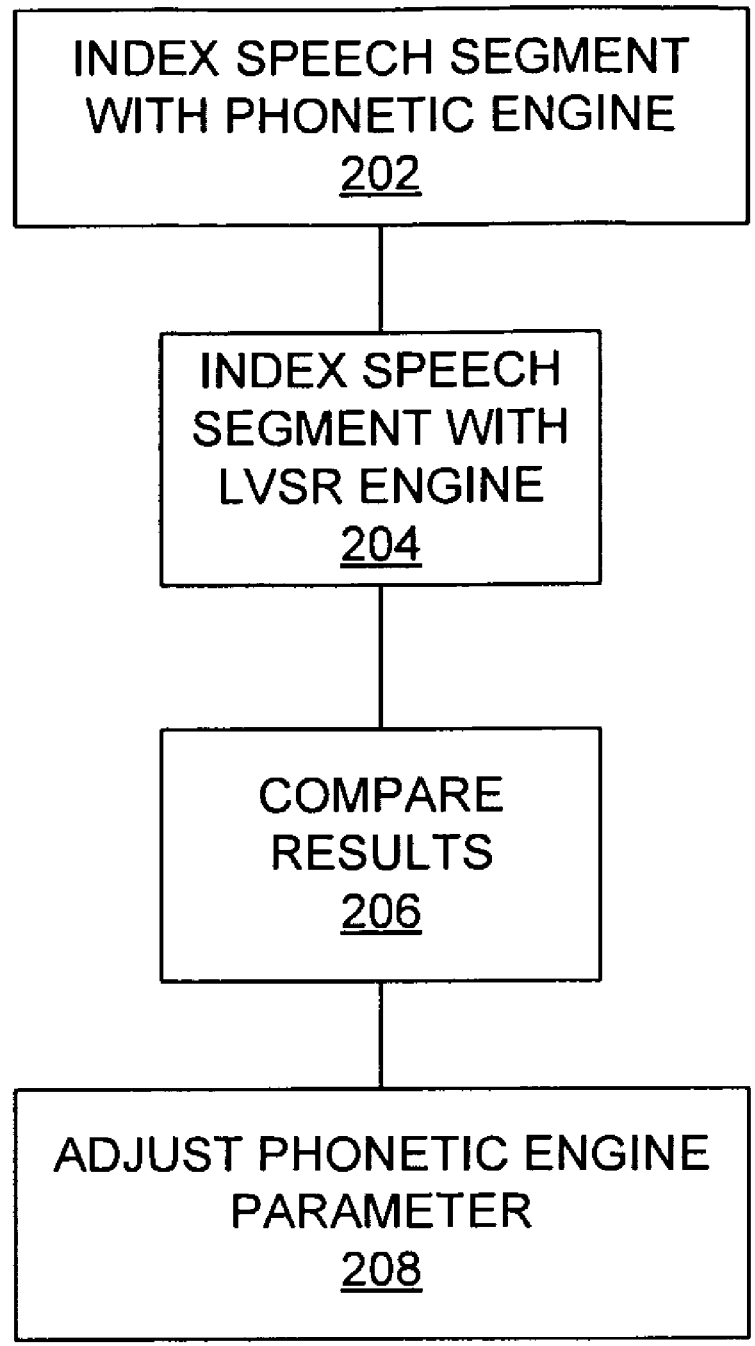
FIG. 2 is a flow diagram illustrating a method of tuning a phonetics based speech indexing system.

FIG. 2 is a flow diagram illustrating a method of tuning a phonetics based speech indexing system. In a step 202, certain speech is indexed with a phonetic engine. The speech may be a recording, multiple recordings, a small segment of a recording, live speech, or some other audio unit. In a step 204, certain speech is indexed with a LVSR engine. The speech may or may not be the same amount of speech indexed in step 202. A larger or smaller amount of speech may be indexed by the LVSR engine as long as there is some way of correlating the LVSR engine generated speech index to the phonetic engine generated speech index. For example, LVSR engine may be asked to only index the first thirty seconds of a recording. The speech index generated by LVSR engine may still be correlated to the phonetic engine speech index since the time offsets to the indexed lexical elements would still be the same because both engines began indexing at the same point in the recording. However, it may be helpful if compare and adjust engine step 206 knew to discard mismatches that occurred after thirty seconds because LVSR engine produced no results for that period. LVSR engine may begin indexing at any arbitrary point, for an arbitrary length of time, and that arbitrary point could be added to the time offsets of the LVSR engine to correlate the speech index generated by LVSR engine to the speech index generated by the phonetic engine.

In a step 206, the results of the two indexing steps 202 and 204 are compared. One method of performing this compare is to examine one or more entries in the speech index generated in step 202 and compare it with corresponding entries in the speech index generated in step 204, or visa versa. Entries that do not appear in both indexes, or at least are not indexed at nearly the same time (or other arbitrary time window), are likely errors. A discussion of an exemplary way that speech indexes may be compared, and the errors that may be discovered, is given in the discussion of compare and adjust engine 140, above.

In a step 208, parameters used in step 202 are adjusted so that the phonetic engine is more likely to produce a correct result for one or more of the errors discovered in step 206. A discussion of exemplary parameters that may be adjusted, and how they may be adjusted, is given in the discussion of compare and adjust engine 140, above.

Figure 3:
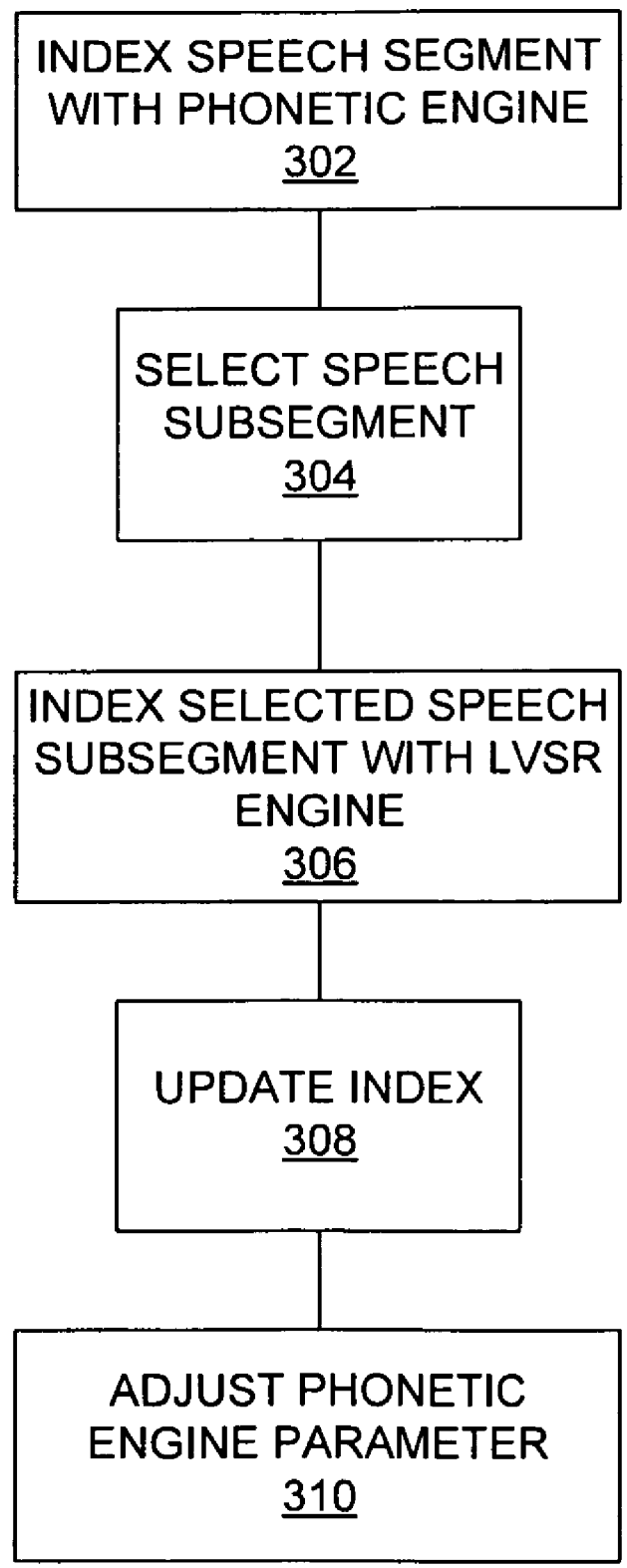
FIG. 3 is a flow diagram illustrating a method of speech indexing and tuning a phonetics based speech indexing system; and, FIG. 4 illustrates a block diagram of a computer system.

FIG. 3 is a flow diagram illustrating a method of speech indexing and tuning a phonetics based speech indexing system. In a step 302, a speech segment is indexed. This speech segment may be all or part of a recording, multiple recordings, a small segment of a recording, live speech, or some other audio unit. In a step 304, a subsegment of the speech segment that was indexed in step 302 is selected. The subsegment may be selected arbitrarily. The subsegment may also be selected according to heuristics that are based upon the results of step 302. For example, step 302 may have chosen a certain lexical element at a certain time with low confidence number. At the other times it selected that lexical element, step 302 selected it with a higher confidence number. The subsegment may then be selected for only the speech in a narrow time window (e.g. subsegment) around the time it selected the lexical element with low confidence number. This selection allows the low confidence selections to be checked by a more accurate speech indexer in subsequent steps.

In a step 306, the speech subsegment selected in step 304 is indexed using the LVSR engine. In a step 308, the speech index generated in step 302 is then updated with the results of step 306. For example, consider the case where the speech subsegment was from 1 minute (00:01:00) to 1 minute 3 seconds (00:01:03). That would mean the result of step 306 is a speech index for 00:01:00 to 00:01:03. The speech index generated by step 302 may then be queried for all of the entries that it indexed between 00:01:00 and 00:01:03. If an entry is the same, and is indexed as occurring at the same time relative to the start of the subsegment, then that entry is likely correct and no action needs to be taken in step 308. However, if an lexical element from the speech index generated by step 302 is different, or is indexed as occurring at a different time relative to the start of the subsegment, then that entry is likely incorrect. In this case, the results from the index generated in step 306 are used to replace the appropriate entries (either by lexical element, time, or both) in the speech index generated in step 302.

In a step 310, parameters used in step 302 are adjusted so that the phonetic engine is more likely to produce the same results as step 306. For example, if a lexical element in the speech index generated in step 302 was selected with a low confidence number, and the speech index generated in step 306 agrees with the low confidence result, an adjustment to a parameter that would increase the confidence of the lexical element selected in step 302 would be made. Likewise, if a lexical element in the speech index generated in step 302 was selected with a high confidence number, and the speech index generated in step 306 disagrees with the high confidence result, an adjustment to a parameter that would decrease the confidence of the lexical element selected in step 302 would be made. A discussion of exemplary parameters that may be adjusted, and how they may be adjusted, is given in the discussion of compare and adjust engine 140, above.

Phonetic engine 120, LVSR engine 130, tunable phonetics based speech indexing system 100, digital recording 108, speech indexes 116 and 132, compare and adjust engine 140, set of models 122, parametric information 124 may all be one or more of: computer systems; implemented on computer systems; stored on computer systems; executed on computer systems; or, contain one or more computer systems. These computer systems are illustrated, by way of example, in FIG. 4.

FIG. 4 illustrates a block diagram of a computer system. Computer system 400 includes communication interface 420, processing system 430, and user interface 460. Processing system 430 includes storage system 440. Storage system 440 stores software 450. Processing system 430 is linked to communication interface 420 and user interface 460. Computer system 400 could be comprised of a programmed general-purpose computer, although those skilled in the art will appreciate that programmable or special purpose circuitry and equipment may be used. Computer system 400 may be distributed among multiple devices that together comprise elements 420-460.

Communication interface 420 could comprise a network interface, modem, port, transceiver, or some other communication device. Communication interface 420 may be distributed among multiple communication devices. Processing system 430 could comprise a computer microprocessor, logic circuit, or some other processing device. Processing system 430 may be distributed among multiple processing devices. User interface 460 could comprise a keyboard, mouse, voice recognition interface, microphone and speakers, graphical display, touch screen, or some other type of user device. User interface 460 may be distributed among multiple user devices. Storage system 440 could comprise a disk, tape, integrated circuit, server, or some other memory device. Storage system 440 may be distributed among multiple memory devices.

Processing system 430 retrieves and executes software 450 from storage system 440. Software 450 may comprise an operating system, utilities, drivers, networking software, and other software typically loaded onto a computer system. Software 450 could comprise an application program, firmware, or some other form of machine-readable processing instructions. When executed by processing system 430, software 450 directs processing system 430 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of indexing speech, comprising:
associating a first phonetic sequence with a first position in an audio signal using a phonetic recognizer;
associating said first phonetic sequence to a first linguistic element based on a first parameter;
associating a second linguistic element with a second position in said audio signal using a large vocabulary speech recognizer (LVSR);
comparing said first position and said second position to determine a phrase window;
comparing said first linguistic element to said second linguistic element if said phrase window meets a first criteria; and
adjusting said first parameter based upon a result of said step of comparing said first linguistic element
wherein said step of associating said second linguistic element is performed on a lesser portion of said audio signal than said step of associating said first phonetic sequence with said first position;
wherein said step of associating said first phonetic sequence to said first linguistic element also associates said first linguistic element with a confidence value and said lesser portion of said audio signal is selected to correspond to said first linguistic element based upon said confidence value.

2. The method of claim 1, further comprising:
associating said first position with said second linguistic element.

3. The method of claim 1, further comprising:
associating said first position with said second linguistic element.

4. The method of claim 1 wherein said step of adjusting said first parameter comprises increasing a probability that said second linguistic element will be associated with said first phonetic sequence by said step of associating said first phonetic sequence to a first linguistic element based on said first parameter.

5. The method of claim 1, wherein said step of comparing further comprises:
correlating a second phonetic sequence associated with said second linguistic element with said first phonetic sequence.

6. A system for indexing speech, comprising:
a phonetic decoder that associates audio features of an audio signal with a first phonetic sequence at a first position in said audio signal;
a lexical interpreter that associates said first phonetic sequence with a first linguistic element based on a first parameter;
large vocabulary speech recognizer that associates a second linguistic element with a second position in said audio signal;
a speech index comparator that compares said first position and said second position to determine a phrase window; and, said speech index comparator also compares said first linguistic element to said second linguistic element if said phrase window meets a first criteria; and
a parameter adjuster that adjusts said first parameter based upon a result of said speech index comparator
wherein said large vocabulary speech recognizer performs said association on a lesser portion of said audio signal than said phonetic decoder;
wherein said lexical interpreter also associates said first linguistic element with a confidence value and said lesser portion of said audio signal is selected to correspond to said first linguistic element based upon said confidence value.

7. The system of claim 6, further comprising:
an index updater that associates said first position with said second linguistic element.

8. The system of claim 6, further comprising:
an index updater that associates said first position with said second linguistic element.

9. The system of claim 6, wherein adjusting said parameter adjuster increases a probability that said second linguistic element will be associated with said first phonetic sequence by said lexical interpreter.

10. The system of claim 6, further comprising:
a phonetic sequence correlator that correlates a second phonetic sequence associated with said second linguistic element with said first phonetic sequence.

11. A program storage device readable by a machine, tangibly embodying a program of instructions executable by the machine to perform method steps for indexing speech, comprising:
associating a first phonetic sequence with a first position in an audio signal using a phonetic recognizer;
associating said first phonetic sequence to a first linguistic element based on a first parameter;
associating a second linguistic element with a second position in said audio signal using a large vocabulary speech recognizer a (LVSR);
comparing said first position and said second position to determine a phrase window;
comparing said first linguistic element to said second linguistic element if said phrase window meets a first criteria; and,
adjusting said first parameter based upon a result of said step of comparing said first linguistic element
wherein said step of associating said second linguistic element is performed on a lesser portion of said audio signal than said step of associating said first phonetic sequence with said first position;
wherein said step of associating said first phonetic sequence to said first linguistic element also associates said first linguistic element with a confidence value and said lesser portion of said audio signal is selected to correspond to said first linguistic element based upon said confidence value.

12. The program storage device of claim 11, wherein the method further comprises:
associating said first position with said second linguistic element.

13. The program storage device of claim 11, wherein the method further comprises:
associating said first position with said second linguistic element.

14. The program storage device of claim 11 wherein said step of adjusting said first parameter comprises increasing a probability that said second linguistic element will be associated with said first phonetic sequence by said step of associating said first phonetic sequence to a first linguistic element based on said first parameter.

* * * * *